United States Patent [19]
Blair et al.

[11] 4,029,254
[45] June 14, 1977

[54] METHOD OF DIFFUSION BONDING AND BRAZING OF MATERIALS

[75] Inventors: Winford Blair, La Mesa; Melvin M. Schwartz, La Jolla, both of Calif.

[73] Assignee: Rohr Industries, Inc., Chula Vista, Calif.

[22] Filed: Aug. 9, 1976

[21] Appl. No.: 712,710

[52] U.S. Cl. .............................. 228/181; 228/214; 228/243
[51] Int. Cl.² .................................... B23K 31/02
[58] Field of Search .......................... 228/131–133, 228/127, 181, 214, 243, 190; 269/266

[56] References Cited
UNITED STATES PATENTS

| | | | |
|---|---|---|---|
| 2,979,808 | 4/1961 | Booth | 269/266 |
| 3,170,428 | 2/1965 | Herman | 228/181 |
| 3,633,267 | 1/1972 | Kent | 228/243 X |
| 3,747,197 | 7/1973 | Riel | 228/243 X |
| 3,930,605 | 1/1976 | Merrill | 228/190 |

OTHER PUBLICATIONS

Smallen & Romaine, "Corrugated Sandwich Structure," Welding Journal, Apr. 1960, pp. 314–321.

*Primary Examiner*—Al Lawrence Smith
*Assistant Examiner*—Nicholas P. Godici
*Attorney, Agent, or Firm*—Patrick J. Schlesinger; Frank D. Gilliam

[57] ABSTRACT

A diffusion and brazing method of bonding honeycomb core material to its facing sheets wherein the core and facing sheets have a predetermined configuration and either the facing sheets or the core edges have had deposited thereon a laminate formed of diffusion bridge or braze alloy material. First, the faying surfaces of the facing sheets and the core are positioned together with the core located between the facing sheets to form the assembly. Secondly, a male plug is inserted into the interior of the assembly wherein the dimensions of the male plug are slightly smaller than the interior dimensions of the asembly and wherein the male plug is formed from a metal having a thermal coefficient of expansion greater than that of the material of the facing sheets and core. Thirdly, the combined male plug and the assembly of the previous step is inserted into a container having an open top surface wherein the height of the container is greater than the height of the assembly and wherein the width of the container is greater than the width of the assembly thereby forming a chamber surrounding the assembly within the container. Next, the chamber is filled with pellets of ceramic, graphite or the like selected size at least to the height of the assembly to produce a positive pressure against the surface of the outer facing sheet due to their weight thereby subjecting the faying surfaces to sufficient pressure to maintain position and alignment for joining. Following this, the container and all the items placed in it in the previous two steps are heated, a protective atmosphere may be required for materials such as titanium or titanium base alloy, from ambient temperatures to a higher temperature wherein diffusion or brazing occurs. The elevated temperature is held lower than the melting point or beta transus of any of the metals involved in the process and, while this heating is continuing, the expansion of the male plug will be exerting kinetic pressure against the interior of the assembly and the pellets located within the chamber will be transferring a portion of this pressure against the outer surface of the predetermined configuration while the lack of a confining surface against the pellets from the top of the chamber allows the level of the pellets to rise and fall as a safety valve against undue pressures being exerted against the walls of the assembly. The temperature is held for a sufficient length of time to enable bonding of the materials. Lastly, the temperature is lowered by a predetermined cooling period to ambient, the protective atmosphere is maintained during cooling where required.

14 Claims, 4 Drawing Figures

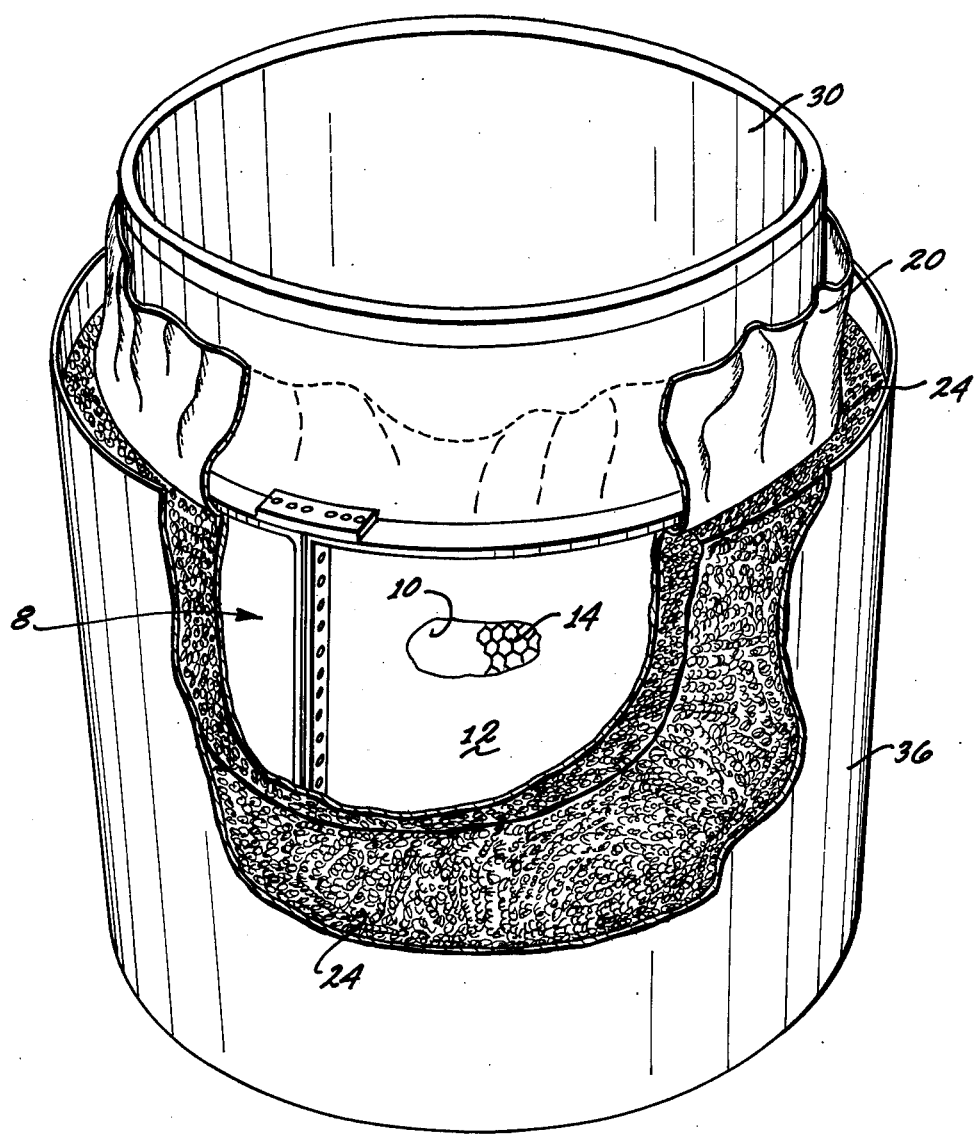

METHOD OF DIFFUSION BONDING AND BRAZING OF MATERIALS

BACKGROUND OF THE INVENTION

This invention relates generally to diffusion bonding and brazing of materials and more specifically to a method of establishing a physical bond between the faying surfaces of joined components such as honeycomb core sandwich panels having either a planar or non-planar configuration.

Diffusion bonding and brazing methods for the cladding of objects of various shapes and for the joining of honeycomb sandwich panel structures have hereinbefore been known and separately used with some degree of success but have not been found to be entirely satisfactory. One method used includes placing a plurality of metal members in juxtaposed intimate contact, sealing the edges thereof normally by welding, submerging the composite structure in a molten salt bath of predetermined characteristics, and applying an external high gas pressure to the salt bath which in turn bonds the members together uniformly throughout. A second method used provides for cladding by means of hydrostatic pressure applied to heated units inside a cold-liquid cladding apparatus of either the oil type or water type.

When diffusion bonding and brazing such material or titanium and titanium alloys, even greater care must be taken to insure that the faying surfaces are maintained free of contaminants. Also, conventional methods of diffusion bonding and brazing are often impractical, especially when applied to honeycomb sandwich panel structures. One method of diffusion used in the past with tubular honeycomb panels consists of depositing a laminate of diffusion bridge material on the core edges and positioning together the faying surfaces of the facing sheets and core. Next, a mandrel is inserted into the interior of the tubular assembly and a molybdenum metal mesh is wound securely around the entire outer surface of the tubular assembly with the mesh being tack welded to the underlaying wrap to hold it in place much in the manner of a girdle. The reason for the mesh is that when titanium is heated to the 1700° F range, it becomes soft with drooping occurring due to its own weight and a restraining structure is necessary to insure good pressure at the faying surfaces while the diffusion bonding is occurring. A major drawback to this method is the fact that the molybdenum mesh become brittle during repeated usage and can normally only be used about four times. This, added to the fact that the mesh is expensive, has made it desirable to look for an alternative method that would eliminate the need for the mesh, thereby saving several hundred dollars per unit to be diffusion bonded on a normal jet engine housing duct.

SUMMARY OF THE INVENTION

The novel method of bonding has been developed basically for use with honeycomb panel structures, although its applicability should not be so limited. Also, the method has been developed to provide a solution to problems produced when the honeycomb panel structures are formed in either a planar or non-planar configuration. Most of the structures produced by using this method are for the aerospace industry and require special care to insure reliability of bonding, absence of contamination of the surfaces being bonded, prevention of stresses in the structure, etc. One such component produced is engine duct housings for jet engines. The novel method will be described as to how it is used when making such an engine duct housing.

Initially, the honeycomb core and facing sheets of material to be formed into a sandwich panel have been prepared to be free of contaminants. The core edges or the face sheets or both have had deposited thereon a laminate formed of diffusion bridge material, such as, but not limited to that described in U.S. Pat. No. 3,854,194 or any suitable brazing material. Since this particular component to be produced is tubular, the core and facing sheets are preformed into a shape and the faying surfaces of the facing sheets and core are positioned together in a sandwich structure. Next, a mandrel is inserted into the interior of the tubular assembly. The diameter of the mandrel is slightly smaller than the interior diameter of the tubular assembly and it is formed of a metal having a thermal coefficient of expansion greater than that of material of the facing sheets and core. The combined mandrel and tubular assembly is then inserted into a container having an open top surface. The height of the container is greater than the height of the tubular assembly. Additionally, the width of the container is greater than the width of the tubular assembly thereby forming a chamber surrounding the tubular assembly within the container. The chamber is then filled with selected pellets at least to the height of the tubular assembly to produce a positive pressure against the surface of the outer facing sheet thereby subjecting the faying surfaces to sufficient pressure to maintain position and alignment for joining. The pellets are of a size such that by merely pouring them into the container they will form a solidly packed medium that will transfer pressure much in the manner of a fluid. The pellets preferably used are made of aluminum oxide or graphite although other types of pellets may also be used. The graphite pellets transfer heat faster than the ceramic pellets to thereby reduce furnace heating time. The container and all the items placed in it in the previous steps are now placed in a furnace, a protective atmosphere may be required for some types of materials, when required and heated from ambient temperature to a higher temperature wherein the diffusion or brazing occurs. The higher temperature is lower than the melting point and beta transus of any of the metals involved in the process. While this heating is continuing, the expansion of the mandrel exerts kinetic pressure against the interior of the tubular assembly and the pellets located within the chamber will be exerting a static pressure against the outer surface of the tubular assembly while the lack of a confining surface against the pellets from the top of the chamber allows the level of the pellets to rise and fall as a safety valve against undue pressures being exerted against the walls of the tubular assembly. The lack of a confining surface on the top of the container is essential since titanium, for example, at a temperature of around 1700° F becomes soft, and if the pellets could not rise and fall unrestricted as a safety valve, the honeycomb core would be crushed by all of the pressure of the mandrel transfered through the pellets. The temperature is controlled at a predetermined level and held for a sufficient length of time to cause the diffusion of the laminate and the base metals to enable the formation of a predetermined alloy at the point bonding or complete the braze joint. After this, the temperature is lowered by a predetermined cooling period to ambient. If a protective atmosphere is required, it is maintained during cooling. Finally, the bonded configuration is removed from the container and mandrel.

It is an object of the present invention to provide a novel diffusion bonding or brazing method of joining the core and facing sheets of planar or non-planar honeycomb panel structures.

It is also an object of the present invention to provide a more economical diffusion bonding or brazing method for joining the core and facing sheets of planar or non-planar honeycomb panel structures.

DESCRIPTION OF THE DRAWINGS

FIG. 2 is a perspective view illustrating a portion of the novel method when the sheets and honeycomb core have been formed into a non-planar configuration.

DESCRIPTION OF THE PREFERRED EMBODIMENT

Figure 1:
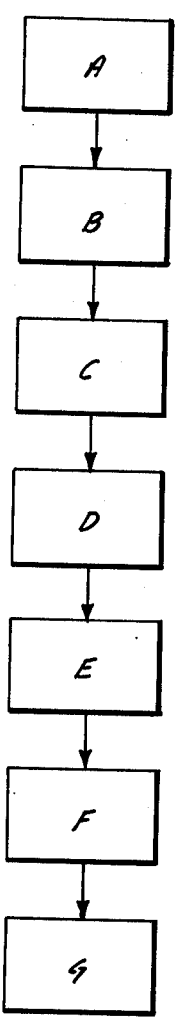
FIG. 1 is a block flow diagram of the novel diffusion or brazing method of bonding honeycomb core material to its facing sheets.
Figure 3:
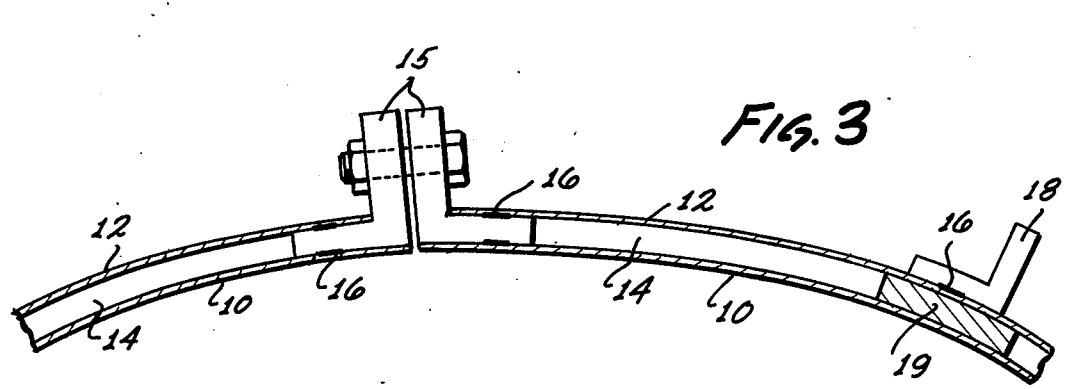
FIG. 3 is a partial cross-section of the jet engine split duct housing illustrated in FIG. 2.

Referring now to FIGS. 1, 2, and 3, the novel diffusion bonding and brazing method for joining the core and facing sheets of non-planar honeycomb panel structures will be described. FIG. 1 is a block diagram illustrating the steps of the invention and FIG. 2 illustrates the manner in which the method is used when a jet engine duct housing, generally designated numeral 8, is being formed.

In step A, inner facing sheet 10, outer facing sheet 12, and honeycomb core 14 are positioned together with their faying surfaces in contact. Prior to this step, the components have been formed into substantially half tubular members. Also the core edges or the facing sheets or both would have had deposited thereon a laminate formed of diffusion bridge material, such as but not limited to, that described in U.S. Pat. No. 3,854,194 or conventional braze alloys. When a spit duct housing such as illustrated is formed, it may be necessary to hold the split skins to the clam shell type edge closures 15 (see FIG. 3) by resistance bonding. In this instance, edge closures 15 plated on their top and bottom surfaces with the laminated bridge or braze alloy material and then inserted between skins 12 and 14 with the plated surfaces in contact therewith to be resistance bonded in place. This substandard joint 16 holds the skins from slipping during the bonding cycle performed in steps E through G to be described later on. This substandard resistance bonded joint 16 is later diffused at the same time honeycomb core 14 is diffusion bonded to skins 12 and 14 making it as good a joint as the honeycomb core joint. The edge closure members are also formed of the same material as the facing sheets and core material. Auxiliary brackets 18 may also be initially attached to the outer surface of skin in the same manner as the edge closures 15 were resistance bonded to skins 12 and 14. A solid plug 19 may be inserted between skins 12 and 14 beneath the auxiliary bracket 18 to provide additional strength for the brackets. A slip sheet 20 of suitable material of approximately 0.010 to 0.060 is wrapped around the outer facing sheet 12 to protect its surface from being marred by scratches from pellets 24 that are described later.

Step B involves inserting a hollow mandrel 30 into the interior of the tubular assembly 8. The diameter of the mandrel is slightly smaller than the interior diameter of the tubular assembly. The mandrel is formed from a metal (in this example, stainless steel No. 321) having a thermal coefficient of expansion greater than that of the material of the facing sheets and core.

Following this in step C, the combined mandrel 30 and tubular configuration 8 are inserted into a container 36 whose height is greater than the height of the tubular assembly. The width of container 36 is also greater than the width of the tubular assembly thereby forming a chamber surrounding the tubular assembly within the container.

The chamber formed in the previous step is filled in step D with pellets 24 at least to the height of the tubular assembly 8 to provide a positive pressure against the surface of facing sheet 12. This positive pressure subjects the faying surfaces to sufficient pressure to maintain position and alignment for joining during the bonding operation. The pellets utilized have been ceramic (aluminum oxide, for example) or graphite although pellets of different materials may also be used. The graphite pellets transfer heat faster than the ceramic pellets thus shortening the heating cycle time. As an illustrative example, pellets having a diameter of 0.063 inch have been successfully used in the bonding of 3 $-^{\circ}$honeycomb core material, the 3 of the designation indicating a core size of 3/16 inch while the 20 refers to a core foil having a thickness of 0.002 inch. This designation for a particular honeycomb core material is recognized in the aerospace industry. While this size of pellets is believed to be optimum for the manufacture of this particular sandwich core material, it may be desirable to change the size of the pellets in bonding a different size of sandwich core material. Ceramic pellets which have been successfully used in the practice of the present invention were obtained from the Coors C. of Golden, Colorado. Graphite pellets which have been successfully used in the practice of the present invention were obtained from Great Lakes Carbon of Niagara Falls, N.Y.

In step E, container 36 and all the items in it are heated from ambient temperature to a higher temperature wherein the diffusion or brazing occurs. Some materials, such as titanium, require a protective atmosphere when headed to an elevated temperature. Thus, temperature is lower than the melting point and beta transus of any of the metals involved in the process. While this heating is continuing, the expansion of the mandrel will be exerting kinetic pressure against the interior of the tubular configuration and the pellets located within the chamber will be transferring a portion of this pressure against the outer surface of the tubular configuration while the lack of a confining surface against the pellets from the top of the chamber allows the level of the pellets to rise and fall as a safety valve against undue pressures being exerted against the walls of the tubular assembly 8.

During step F, the temperature is maintained at a controlled rate of a predetermined level and held for a sufficient length of time to cause diffusion of the laminate materials into the base metals to enable the formation of a predetermined alloy at the point of bonding or to meet the braze material to complete the braze joint.

The final step G consists of lowering the temperature by a predetermined cooling period to ambient and for certain materials maintaining the protective atmosphere during cool down.

Figure 4:
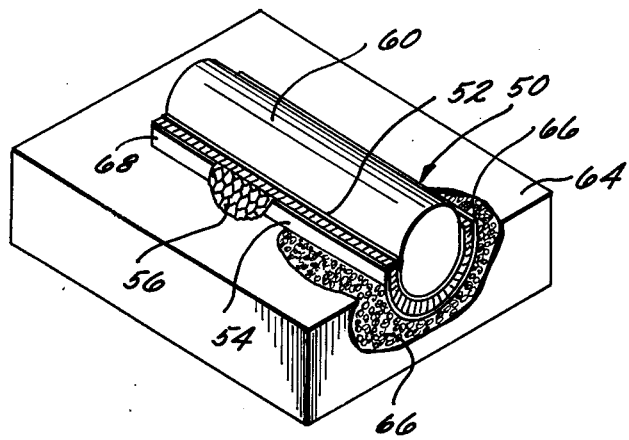
FIG. 4 is a perspective view illustrating a portion of the novel method when the sheets and honeycomb core have been into a U-shaped configuration.

A second embodiment is illustrated in FIG. 4, and it relates to a method of diffusion bonding or brazing a component 50 having a U-shaped configuration. The inner facing sheet 52, outer facing sheet 54, and honeycomb core 56 are made of the same material and the core edges or facing sheets or both have had deposited thereon a laminate formed of diffusion bridge material or conventional braze alloy. The steps of the method previously described with respect to the tubular assembly 8 would be equally applicable to the U-shaped assembly with the following exceptions. A male plug or mandrel 60 would be inserted into the interior of the U-shaped member 50 during step B and it would have the same characteristics as mandrel 30 and function in the same manner. Container 64 is different in shape but would function in the same manner provided a chamber exists around the U-shaped member that could be filled with pellets 66. A slip sheet 68 would be used to protect the outer facing sheet of member 50.

Having thus described the invention, what is claimed as new and useful and desired to be secured by United States Letters Patent is:

1. A method of bonding honeycomb core material to its facing sheets wherein said core and facing sheets have been formed into a substantially semi-circular configuration and wherein said core and facing sheets are made of similar material and the edges of said core and said facing sheets or both have had deposited thereon a laminate formed of diffusion bridge or braze alloy material which comprises the steps of:
   a. positioning together the faying surfaces of the facing sheets and core to be bonded with the core located between the facing sheets thereby forming a generally tubular assembly;
   b. inserting a mandrel into the interior of the tubular assembly wherein the diameter of the mandrel is slightly smaller than the interior diameter of the tubular assembly and wherein the mandrel is formed from a metal having a thermal coeffecient of expansion greater than that of the material of the facing sheets and core;
   c. inserting the combined mandrel and tubular assembly of step (b) into a container having an open top surface wherein the height of the container is greater than the height of the tubular assembly and wherein the width of the container is greater than the width of the tubular assembly thereby forming a chamber surrounding the tubular assembly within the container;
   d. filling the chamber formed in step (c) with pellets at least to the height of the tubular assembly to produce a positive pressure against the surface of the outer facing sheet thereby subjecting the faying surface to sufficient pressure to maintain position and alignment for joining;
   e. heating the container and all the items placed in it in steps (c) and (d) from ambient temperature to a higher temperature wherein joinder occurs at a temperature lower than the beta transus of any of the metals involved in the process and while this heating is continuing, the expansion of the mandrel will be exerting kinetic pressure against the interior of the tubular assembly and the pellets located within the chamber will be transferring at least a portion of said pressure against the outer surface of the tubular assembly while the lack of a confining surface against the pellets from the top of the chamber allows the level of the pellets to rise and fall as a safety valve against undue pressures being exerted against the walls of the tubular assembly;
   f. maintaining the temperature at a controlled rate at a predetermined level and holding it for a sufficient length of time to cause bonding of the materials, and;
   g. lowering the temperature by a predetermined cooling period to ambient.

2. The bonding method claim 1, wherein said materials are in a protective atmosphere during steps (e), (f) and (g).

3. The method of bonding honeycomb core material to its facing sheets as set forth in claim 1 wherein a sheet of protective material is wrapped around the tubular assembly after step (a) and before step (b) to prevent the outer surface of the tubular assembly from being scratched and having its surface marred by the pellets recited in step (d).

4. The method of bonding honeycomb core material to its facing sheets as set forth in claim 1 wherein the pellets recited in step (d) are made of graphite.

5. The method of bonding honeycomb core material to its facing sheets as set forth in claim 1 wherein the pellets recited in step (d) are made of a ceramic material.

6. A method of bonding honeycomb core material to its facing sheets as set forth in claim 5 wherein the ceramic material is aluminum oxide.

7. A method of bonding honeycomb core material to its facing sheets wherein said core and facing sheets have been formed into a U-shaped configuration and wherein said core and facing sheets are made of the same material and said core edges or said facing sheets or both have had deposited thereon a laminate formed of diffusion bridge or braze alloy material which comprises the steps of:
   a. positioning together the faying surfaces of the facing sheets and core to be bonded with the core located between the facing sheets thereby forming a U-shaped assembly;
   b. inserting a male plug into the interior of the U-shaped assembly wherein the dimensions of the male plug are slightly smaller than the interior dimensions of the U-shaped configuration and wherein the male plug is formed from a metal having a thermal coefficient of expansion greater than that of the material of the facing sheets and core;
   c. inserting the combined male plug and U-shaped assembly of step (b) into a container having an open top surface wherein the height of the container is greater than the height of the U-shaped assembly and wherein the width of the container is greater than the width of the U-shaped assembly thereby forming a chamber surrounding the U-shaped assembly within the container;
   d. filling the chamber formed in step (c) with pellets at least to the height of the U-shaped assembly to produce a positive pressure against the surface of the outer facing sheet thereby subjecting the faying surface to sufficient pressure to maintain position and alignment for joining;
   e. heating the container and all the items placed in it in steps (c) and (d) from ambient temperature to a temperature which is lower than the beta transus of any of the metals involved in the process and while this heating is continuing, the expansion of the male plug will be exerting kinetic pressure against the interior of the U-shaped assembly and the pellets located within the chamber will be exerting at least a portion of said pressure against the outer surface of the U-shaped assembly while the lack of a confining surface against the pellets from the top of the chamber allows the level of the pellets to rise and fall as a safety valve against undue pressures being exerted against the walls of the U-shaped assembly;

f. maintaining the temperature at a predetermined level and holding it for a sufficient length of time to cause the bonding and;

g. lowering the temperature by a predetermined cooling period to ambient.

8. The bonding method of claim 7, wherein said materials are in a protective atmosphere during steps (e), (f) and (g).

9. The method of bonding honeycomb core material to its facing sheets as set forth in claim 7 wherein a sheet of material is wrapped around the U-shaped assembly after step (a) and before step (b) to prevent the outer surface of the U-shaped assembly from being scratched and having its surface marred by the pellets recited in step (d).

10. The method of bonding honeycomb core material to its facing sheets as set forth in claim 7 wherein the pellets recited in step (d) are made of graphite.

11. The method of bonding honeycomb core material to its facing sheets as set forth in claim 7 wherein the Pellets recited in step (d) are made of a ceramic material.

12. The method of bonding honeycomb core material to its facing sheets as set forth in claim 11 wherein the ceramic material is aluminum oxide.

13. A method of bonding core material to its facing sheets wherein the same said core edges or said facing sheets or both have had deposited thereon a laminate formed of bridge material which comprises the steps of:

a. positioning together the faying surfaces of the faying sheets and core to be bonded with core located between the facing sheets thereby forming a sandwich configuration and resistance bonding the skins to the core to prevent the skins from slipping during the bonding cycle that takes place during steps (e) through (f);

b. positioning a mandrel against the interior facing sheet of the sandwich configuration and wherein the mandrel is formed from a metal having a thermal coefficient of expansion greater than that of the material of the facing sheets and core;

c. inserting the combined mandrel and sandwich configuration of step (b) into a container having an open top wherein the height of the container is greater than the height of the sandwich configuration and wherein the width of the container is greater than the bombined width of the sandwich configuration and the mandrel thereby forming a chamber surrounding the sandwich configuration and the mandrel within the container;

d. filling the chamber formed in step (c) with pellets at least to the height of the sandwich configuration to produce a positive pressure against the surface of the outer facing sheet thereby subjecting the faying surface to sufficient pressure to maintain position and alignment for joining;

e. heating the container and all the items placed in it in steps (c) and (d) at a temperature lower than the beta transus of any of the metals involved in the process and while this heating is continuing, the expansion of the sandwich configuration will be exerting kinetic pressure against the interior of the sandwich configuration and the pellets located within the chamber will be exerting a portion of said pressure against the outer surface of the sandwich configuration while the lack of a confining surface against the pellets from the top of the chamber allows the level of the pellets to rise and fall as a safety valve against undue pressures being exerted against the walls of the sandwich configuration;

f. maintaining the temperature at a controlled rate at a predetermined level and holding it for a sufficient length of time to cause bonding of the materials; and g. lowering the temperature by a predetermined cooling period to ambient.

14. The bonding method claim 13, wherein said materials are in a protective atmosphere during steps (e), (f) and (g).

* * * * *